3,434,951
ELECTRODEPOSITION OF PAINT USING
FORMALDEHYDE TO CONTROL pH
Norman Morin Ness, Taplow, Auguste Louis Lucien
Palluel, Langley, and Clive Douglas Cook, Marlow,
England, assignors to Imperial Chemical Industries
Limited, London, England, a corporation of Great
Britain
No Drawing. Filed Apr. 19, 1965, Ser. No. 448,915
Claims priority, application Great Britain, Apr. 23, 1964,
16,896/64
Int. Cl. B01k 5/02; C23b 11/00, 13/00
U.S. Cl. 204—181                                        4 Claims

ABSTRACT OF THE DISCLOSURE

An improved process of electrodepositing paint coatings from aqueous dispersions of film-forming material containing acidic groups neutralised by ammonia or a primary or secondary amine in which the pH value of the dispersion is controlled by the addition of formaldehyde. The addition of formaldehyde may be used to control the pH value of the aqueous dispersion within the range 7 to 9, which range is particularly suitable for the production of smooth continuous coatings. Preferably the addition of the formaldehyde is continuous or substantially continuous during the coating process so as to maintain substantially constant pH conditions.

---

This invention relates to a process of electrodepositing paint coatings on articles immersed in a liquid coating composition.

In such a process the articles aer immersed in an aqueous dispersion of an ionised film-forming material such as a synthetic resin and an electrical current is passed between the articles and another electrode to cause deposition of a coating of film-forming material on the articles. The articles are then withdrawn from the liquid and, depending on the nature of the film-forming material, are air-dried or stoved to form a smooth, hard, paint film. The dispersed resin is usually pigmented. The term "dispersed" is intended to include not only resins in the form of stable micelles or particles, but also resins in the dissolved, i.e. molecularly dispersed, state.

The synthetic resins most commonly used as the film-forming material are ones containing acidic groups which are neutralised by a base to render them water-dispersible. Typical film-forming materials of this type are maleinised oils, alkyd resins, usually of low molecular weight and high acid value, and vinyl copolymers containing acid groups. The term "maleinised oils" is used also to include oils modified by reaction with other $\alpha,\beta$-unsaturated dibasic acids such as fumaric and examples of maleinised oils are maleinised linseed oil, maleinised hydrated castor oil, and fumarised tung oil. Examples of alkyl resins are trimellitic anhydride resins and oil-modified alkyd resins of high acid value such as coconut oil-modified alkyd resins and drying oil-modified tetrachlorphthalic alkyd resins. Suitable alkyd resins may be blended with water-dispersible phenolic resins. Examples of vinyl copolymers are acidic acrylic copolymers such as butyl acrylate/acrylic acid copolymer and ethyl acrylate/itaconic acid/acrylamide 85/10/5 copolymer. The resins are dispersed in water by partial or complete neutralisation, i.e. neutralisation of some or all of the acidic groups, with a base, usually ammonia or an amine.

Alternatively, non-acidic film-forming resins may be dispersed in water using a surface-active agent containing acidic groups such as sulphonic groups. In this case a base is added to adjust the pH value of the dispersion to that best suited for electrodeposition.

The resins so dispersed in water are anionic in nature and when they are subjected to an electric field they migrate to the anode. As the resin is deposited on the article to be coated, this being made the anode, there is a release of a corresponding amount of the base by discharge at the cathode and unless the base is sufficiently volatile for it to evaporate from the solution there is a tendency for it to accumulate in the coating bath as the bath is replenished by addition of further resin/base composition. This leads to an increase in the pH value of the coating bath and generally is undesirable for, as the pH value rises above the desired value, the coatings produced in the bath become thinner and rougher.

This invention provides an improved process of electrodepositing paint coatings from aqueous dispersions of film-forming material containing acidic groups neutralised by ammonia or a primary or secondary amine in which the pH value of the dispersion is controlled by the addition of formaldehyde.

The term "formaldehyde" includes not only formaldehyde itself but derivatives which can generate or react as formaldehyde, such as paraformaldehyde, trioxy methylene and hemi-acetals, for example, solutions of formaldehyde in alcohols such as methanol and butanol.

The amount of formaldehyde required to be added will depend, of course, on the amount of accumulated free base in the aqueous coating composition. The addition of formaldehyde may be used to control the pH value of the aqueous dispersion within the range 7 to 9, which range is particularly suitable for the production of smooth continuous coatings. Preferably the addition of the formaldehyde is continuous or substantially continuous during the coating process so as to maintain substantially constant pH conditions. When the bath has been used and replenished for some time, the pH value may inevitably begin to rise in spite of the addition of formaldehyde, but even so the rate of rise is far less than it would be if no formaldehyde were added; this control over the rate of rise of pH value makes it possible to use coating baths for longer periods.

For example, in a process of electrodepositing coatings from an aqueous dispersion of a pigmented blend of a low molecular weight maleinised oil-modified alkyd resin and an acidic phenolic resin, the pH value of the dispersion rose to 7.9 due to accumulation of ammonia used to disperse the resin blend in the aqueous phase. It was found that, by addition of a stabilised 37% aqueous solution of formaldehyde in a proportion of 3.5 gms. formaldehyde solution per litre of dispersion the pH value of the dispersion could be reduced to 7.3.

Similar results were obtained when the alkyd resin was replaced by maleinised oil or by a vinyl copolymer containing acidic groups.

We claim:
1. A process of electrodepositing paint coatings from aqueous dispersions of film-forming material containing acidic groups at least partially neutralised by a base se- lected from the group consisting of ammonia or primary or secondary amines in which the pH value of the dispersion is controlled by the addition of formaldehyde.

2. A process as claimed in claim 1 in which the pH value of the dispersion is controlled within the range 7 to 9.

3. A process as claimed in claim 1 in which the acidic groups are neutralised by ammonia.

4. A process as claimed in claim 2 in which the acidic groups are neutralised by ammonia.

References Cited

UNITED STATES PATENTS

| 3,230,162 | 1/1966 | Gilchrist | 204—181 |
| 3,254,042 | 5/1966 | Cogswell. | |
| 3,304,250 | 2/1967 | Gilchrist | 204—181 |

JOHN H. MACK, *Primary Examiner.*

E. ZAGARELLA, *Assistant Examiner.*